(12) United States Patent
Liu et al.

(10) Patent No.: US 11,777,694 B2
(45) Date of Patent: *Oct. 3, 2023

(54) METHOD, RELATED DEVICE AND SYSTEM FOR SEARCHING FOR SS BLOCK

(71) Applicant: VIVO MOBILE COMMUNICATION CO., LTD., Chang'an Dongguan (CN)

(72) Inventors: Siqi Liu, Chang'an Dongguan (CN); Xueming Pan, Chang'an Dongguan (CN); Yu Ding, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/732,641

(22) Filed: Apr. 29, 2022

(65) Prior Publication Data

US 2022/0256488 A1 Aug. 11, 2022

Related U.S. Application Data

(63) Continuation of application No. 16/625,423, filed as application No. PCT/CN2018/091034 on Jun. 13, 2018, now Pat. No. 11,356,964.

(30) Foreign Application Priority Data

Jun. 21, 2017 (CN) .......................... 201710474320.4

(51) Int. Cl.
*H04L 5/00* (2006.01)
*H04W 48/16* (2009.01)
(Continued)

(52) U.S. Cl.
CPC .......... *H04L 5/0092* (2013.01); *H04L 5/0048* (2013.01); *H04L 27/2613* (2013.01);
(Continued)

(58) Field of Classification Search
CPC ........................... H04W 48/16; H04W 56/001; H04W 72/0453
See application file for complete search history.

(56) References Cited

U.S. PATENT DOCUMENTS 11,356,964 B2* 6/2022 Liu ....................... H04L 5/0092
2013/0195069 A1 8/2013 Frederiksen et al.
(Continued)

FOREIGN PATENT DOCUMENTS

CN 101959171 A 1/2011
CN 104081828 A 10/2014
(Continued)

OTHER PUBLICATIONS

International Search Report & Written Opinion related to Application No. PCT/CN2018/091034; dated Aug. 15, 2018.
(Continued)

*Primary Examiner* — Diane D Mizrahi
(74) *Attorney, Agent, or Firm* — von Briesen & Roper, s.c.

(57) ABSTRACT

Embodiments of the present disclosure provide a method, a related device and a system for searching for a Synchronization Signal Block (SS block). The method includes: receiving detection configuration information of the SS block transmitted by a network device; and searching for the SS block according to the detection configuration information.

20 Claims, 5 Drawing Sheets

(51) Int. Cl.
  *H04W 56/00* (2009.01)
  *H04W 72/0453* (2023.01)
  *H04L 27/26* (2006.01)
  *H04W 84/04* (2009.01)

(52) U.S. Cl.
  CPC ......... *H04W 48/16* (2013.01); *H04W 56/001* (2013.01); *H04W 72/0453* (2013.01); *H04W 84/042* (2013.01)

(56) References Cited

U.S. PATENT DOCUMENTS

| | | |
|---|---|---|
| 2015/0092768 A1 | 4/2015 | Ng et al. |
| 2017/0280331 A1 | 9/2017 | Gou et al. |
| 2019/0215712 A1 | 7/2019 | Babaei et al. |
| 2019/0273550 A1 | 9/2019 | Li et al. |

FOREIGN PATENT DOCUMENTS

| | | |
|---|---|---|
| CN | 104301273 A | 1/2015 |
| CN | 104753832 A | 7/2015 |
| CN | 105580297 A | 5/2016 |
| CN | 106797611 A | 5/2017 |
| CN | 108092930 A | 5/2018 |
| WO | 2016130175 A1 | 5/2016 |
| WO | 201852275 A1 | 3/2018 |

OTHER PUBLICATIONS

First Chinese Office Action for related Application No. 201710474320.4; dated Dec. 4, 2019.
Second Chinese Office Action for related Application No. 201710474320.4; dated Mar. 16, 2020.
Chinese Search Report for related Application No. 201710474320.4; dated Apr. 17, 2019.
Extended European Search Report for related Application No. 18820518.1; dated May 15, 2020.
United States Non-Final Office Action for related U.S. Appl. No. 16/625,423; dated Aug. 27, 2021.
Huawei, Hisilicon, "Discussion on SS burst set composition and SS block time index indication", Apr. 7, 2017, 3GPP TSG RAN WG1 Meeting #88bis, Spokane, USA, R1-1705052.
ZTE, "On SS block time index indication", May 15-19, 2017, 3GPP TSG RAN WG1 Meeting #89, Hangzhou, China, R1-1707044.
ZTE, "RRM measurements on IDLE mode RS", May 15-19, 2017, 3GPP TSG RAN WG1 Meeting #89, Hangzhou, P.R. China, R1-1707050.
Fujitsu, "Consideration on SS block time index indication", May 15-19, 2017, 3GPP TSG RAN WG1 Meeting #89, Hangzhou, P.R. China, R1-1707252.
Motorola Mobility, Lenovo, "Indication of SS block timing information", May 15-19, 2017, 3GPP TSG RAN WG1 Meeting #89, Hangzhou, P.R. China, R1-1708304.
LG Electronics, "Consideration on NR-PBCH contents and payload size", Jun. 27-30, 2017, 3GPP TSG RAN WG1 NR Ad-Hoc#2, Qingdao, P.R. China, R1-1710262.
AT&T, "SS block transmissions in a wideband CC", Jun. 27-30, 2017, 3GPP TSG RAN WG1 NR Ad-Hoc#2, Qingdao, China, R1-1710420.
Intel Corporation, "NR PBCH Design", Jun. 27-30, 2017, 3GPP TSG RAN WG1 Meeting Ad-hoc#2, Qingdao, P.R. China, R1-1710507.
AT&T, "Min. system bandwidth and SS Block SCS", Jun. 27-29, 2017, 3GPP TSG-RAN WG4 Meeting NR #2, Qingdao, China, R4-1706501.

* cited by examiner

METHOD, RELATED DEVICE AND SYSTEM FOR SEARCHING FOR SS BLOCK

CROSS-REFERENCE TO RELATED APPLICATION

This application a continuation of U.S. patent application Ser. No. 16/625,423 which is the U.S. national phase of PCT Application No. PCT/CN2018/091034 filed on Jun. 13, 2018, which claims the benefit and priority of Chinese Application No. 201710474320.4, filed on Jun. 21, 2017, which is incorporated herein by reference in its entirety.

TECHNICAL FIELD

The present disclosure relates to the field of communication technologies, and in particular to a method, a related device and a system for searching for a Synchronization Signal Block (SS block).

BACKGROUND

In a communication system (for example, the 5G system), in order to realize a user equipment's initial access and radio resource management (RRM) measurement, a network device is required to transmit a synchronization signal block (SS block), which may also be referred to as physical channel block, for the user equipment to perform measurement evaluation. A plurality of SS blocks form a Synchronization Signal burst (SS burst), and a plurality of SS bursts form a Synchronization Signal burst set (SS burst set).

Currently, the user equipment searches for the SS block according to the default SS burst set period (20 milliseconds). Due to the large span of frequency bands of New Radio (NR), the user equipment may have to perform a full-band search to determine a working carrier of a cell and then continue to perform the SS block search on the carrier. It can be seen that the efficiency of searching for the SS block by the user equipment in the related art is relatively low.

SUMMARY

According to a first aspect, one embodiment of the present disclosure provides a method for searching for a synchronization signal block (SS block), which is applied to user equipment, including:
receiving detection configuration information of the SS block transmitted by a network device; and
searching for the SS block according to the detection configuration information.

According to a second aspect, one embodiment of the present disclosure provides a method for searching for a synchronization signal block (SS block), which is applied to a network device, including:
obtaining detection configuration information of the SS block; and
transmitting the detection configuration information to user equipment, wherein the detection configuration information is used by the user equipment to search for the SS block according to the detection configuration information.

According to a third aspect, one embodiment of the present disclosure provides user equipment including:
a receiving module configured to receive detection configuration information of a Synchronization Signal Block (SS block) transmitted by a network device; and
a searching module configured to search for the SS block according to the detection configuration information.

According to a fourth aspect, one embodiment of the present disclosure provides a network device, including:
an obtaining module configured to obtain detection configuration information of a Synchronization Signal Block (SS block); and
a transmission module configured to transmit the detection configuration information to user equipment, wherein the detection configuration information is used by the user equipment to search for the SS block according to the detection configuration information.

According to a fifth aspect, one embodiment of the present disclosure provides a user equipment, including: a processor, a memory, a network interface and a user interface. The processor, the memory, the network interface and the user interface are coupled together by a bus system, the processor is configured to read a program in the memory to perform steps in the method for searching for a synchronization signal block (SS block), which is applied to the user equipment.

According to a sixth aspect, one embodiment of the present disclosure provides a network device including: a processor, a memory, a transceiver and a user interface. The processor, the memory, the transceiver and the user interface are coupled together by a bus system, and the processor is configured to read a program in the memory to perform steps in the method for searching for a synchronization signal block (SS block), which is applied to the network device.

According to a seventh aspect, one embodiment of the present disclosure provides a system for searching for a Synchronization Signal Block (SS block), including the user equipment and the network device.

According to an eighth aspect, one embodiment of the present disclosure provides a computer readable storage medium including a search program of a Synchronization Signal Block (SS block) stored therein. The search program of the SS block is executed by a processor to implement steps of the method for searching for a synchronization signal block (SS block), which is applied to the user equipment.

According to a ninth aspect, one embodiment of the present disclosure provides a computer readable storage medium including a search program of a Synchronization Signal Block (SS block) stored therein. The search program of the SS block is executed by a processor to implement steps of the method for searching for a synchronization signal block (SS block), which is applied to the network device.

BRIEF DESCRIPTION OF THE DRAWINGS

In order to illustrate technical solutions according to embodiments of the present disclosure more clearly, drawings to be used in the description of the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

The technical solutions in the embodiments of the present disclosure are clearly and completely described in the following with reference to the accompanying drawings in the embodiments of the present disclosure. It is obvious that the described embodiments are a part of the embodiments of the present disclosure, and not all of the embodiments. All other embodiments obtained by a person of ordinary skill in the art based on the embodiments of the present disclosure without departing from the inventive scope are the scope of the disclosure.

Figure 1:
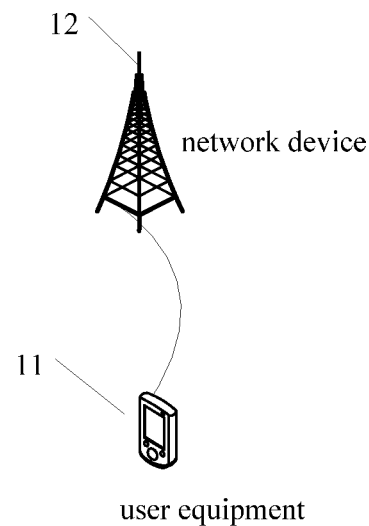
FIG. 1 is a structural diagram of a system for searching for an SS block according to an embodiment of the present disclosure.

Referring to FIG. 1, FIG. 1 is a structural diagram of a system for searching for an SS block according to an embodiment of the present disclosure. As shown in FIG. 1, the system includes a user equipment (UE) 11 and a network device 12. The user equipment 11 may be a terminal device, e.g., a mobile phone, a Tablet Personal Computer, a Laptop Computer, a personal digital assistant (PDA), a Mobile Internet Device (MID), or a Wearable Device. It should be noted that, in the embodiments of the present disclosure, specific type of the user equipment 11 is not limited. The user equipment 11 can establish communication with the network device 12. In the network shown in the attached figure, the user equipment 11 can establish wireless communication with the network device 12. The network device 12 may be a Transmission Reception Point (TRP) or a base station. The base station may be a macro station, such as, LTE eNB, 5G NR NB. The network device 12 may also be an Access Point (AP).

It should be noted that, in the embodiments of the present disclosure, specific type of the network device 12 is not limited. The specific functions of the user equipment 11 and the network device 12 will be described in details with the following embodiments.

Figure 2:
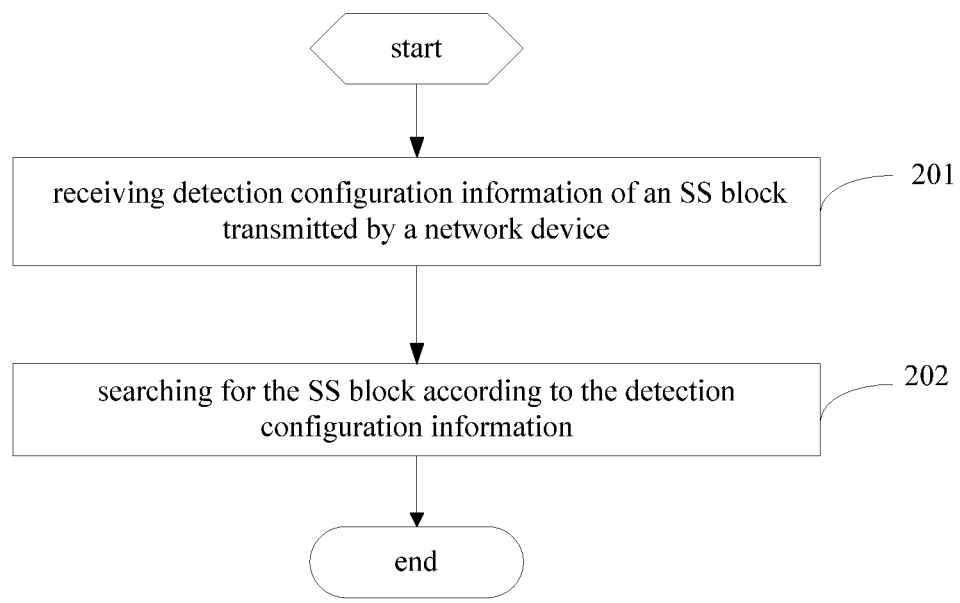
FIG. 2 is a flowchart of a method for searching for an SS block according to an embodiment of the present disclosure.

Referring to FIG. 2, FIG. 2 is a flowchart of a method for searching for an SS block according to an embodiment of the present disclosure. As shown in FIG. 2, this method is applied to a user equipment and includes the following steps.

Step 201: receiving detection configuration information of an SS block transmitted by a network device.

The above detection configuration information may be configuration information which is used to assist the user equipment to search for the SS block. For example, the detection configuration information may be frequency information of a carrier where the SS block is located, location information of the SS block, detection information of a synchronization Signal (SS) sequence in the SS block, or detection information of a Physical Broadcast Channel (PBCH) of the SS block, which is not limited in this embodiment of the present disclosure.

Step 202: searching for the SS block according to the detection configuration information.

The searching for the SS block according to the detection configuration information may include: determining location of the SS block or frequency of the carrier where the SS block is located according to the detection configuration information, and then searching for the SS block at the corresponding location, thereby improving the efficiency of searching for the SS block. In addition, searching for the SS block may be referred to as SS block blind detection, so that the above steps can reduce the time of the SS block blind detection and save power consumption of the user equipment. In addition, the network device sends the detection configuration information to the user equipment, so that the user equipment can search for the SS block according to the detection configuration information, thereby improving the efficiency of searching for the SS block by the user equipment. For example, the network device may be a primary carrier network device, the above SS block is an SS block of a secondary carrier and the above detection configuration information includes an SS burst set period, then the user equipment can search for the SS block on the secondary carrier according to the actual SS burst set period. This can solve limitation to the frequency at which the secondary carrier network device sends the SS block, caused by that the user equipment searches for the SS block on the secondary carrier according to the default SS burst set period, and support the secondary carrier network device to configure a larger SS burst set period according to needs, so as to save power consumption of the secondary carrier network device.

It should be noted that the foregoing method may be applied to the 5G or LTE evolved communication system.

In this embodiment, the detection configuration information of the SS block sent by the network device is received, and the SS block is searched according to the detection configuration information. Since the user equipment searches for the SS block according to the detection configuration information, the efficiency of searching for the SS block can be improved, thereby reducing time of the SS block blind detection and saving the power consumption of the user equipment.

Figure 3:
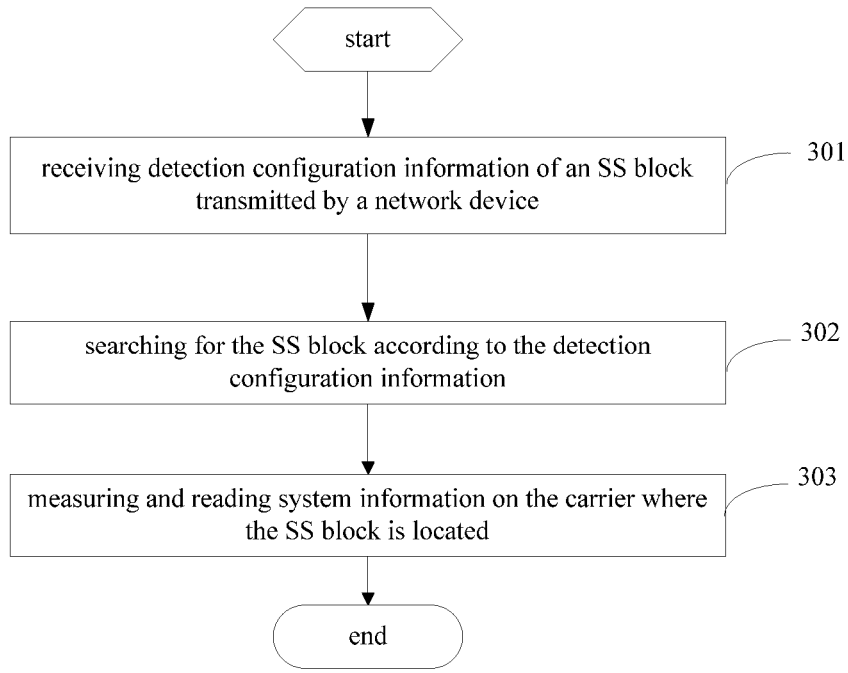
FIG. 3 is a flowchart of another method for searching for an SS block according to an embodiment of the present disclosure.

Referring to FIG. 3, FIG. 3 is a flowchart of another method for searching for an SS block according to an embodiment of the present disclosure. As shown in FIG. 3, this method is applied to a user equipment and includes the following steps.

Step 301: receiving detection configuration information of an SS block transmitted by a network device.

Step 302: searching for the SS block according to the detection configuration information.

Optionally, the foregoing detection configuration information includes at least one of the following:

frequency information of carrier and SS block auxiliary information.

The carrier is a carrier where the SS block is located, that is, the SS block is transmitted on the carrier. In addition, in the scenario where the user equipment is in dual connectivity, such as Long Term Evolution (LTE) and NR dual connection, or in NR multi-carrier scenario, the foregoing carrier may also be a secondary carrier. Of course, in some scenarios, the foregoing carrier may also be a primary carrier, which is not limited in this embodiment of the present disclosure.

In addition, the foregoing frequency information may represent a frequency range of the foregoing carrier. The foregoing SS block auxiliary information may be related information which is used to assist the user equipment in searching for the SS block in the carrier.

In this embodiment, the searching for the SS block according to the detection configuration information, may include:

determining frequency of the carrier according to the frequency information, and searching for the SS block at the frequency; or, searching for frequency of the carrier, and searching for the SS block at the frequency according to the SS block auxiliary information; or, determining frequency of the carrier according to the frequency information, and searching for the SS block at the frequency according to the SS block auxiliary information.

The frequency of the carrier may be a frequency range of the carrier. Through the foregoing steps, the user equipment can quickly search for the SS block.

In addition, if the carrier is the secondary carrier, the receiving detection configuration information of the SS block transmitted by the network device, may include:

receiving the detection configuration information of the SS block transmitted by a primary carrier network device.

The searching for the SS block according to the detection configuration information, includes:

searching for the SS block on a corresponding secondary carrier according to the detection configuration information.

In this implementation manner, the detection configuration information of the SS block of the secondary carrier is obtained through the primary carrier network device, so that the user equipment quickly searches for the SS block of the corresponding secondary carrier. For example, after the user equipment accesses the primary carrier network device, the primary carrier network device can send the detection configuration information of the SS block of the secondary carrier to the user equipment, so that the user equipment can quickly search for the SS block of the corresponding secondary carrier. In this embodiment, since the primary carrier network device sends the detection configuration information of the secondary carrier to the user equipment, it can support the secondary carrier network device to configure a larger SS burst set period according to needs, thereby saving the power consumption of the secondary carrier network device.

Optionally, the receiving the detection configuration information of the SS block transmitted by the primary carrier network device, includes:

receiving high layer signaling transmitted by the primary carrier network device, where the high layer signaling includes the detection configuration information of the SS block.

In this implementation manner, the detection configuration information can be transmitted through the high layer signaling, so that the signaling overhead can be reduced. The foregoing high layer signaling may be Radio Resource Control (RRC) signaling or other high layer signaling, which is not limited in this embodiment of the present disclosure. Besides, the detection configuration information may be transmitted through user terminal dedicated signaling.

Optionally, the foregoing secondary carrier is an NR carrier, and the primary carrier network device is an LTE network device; or, the secondary carrier is an NR secondary component carrier, and the primary carrier network device is an NR network device.

In this embodiment, the detection configuration information of the secondary carrier is transmitted by the LTE network device in the LTE-NR dual connectivity scenario. Besides, in the NR multi-carrier scenario, the detection configuration information of the secondary carrier is transmitted by the NR network device corresponding to the primary carrier. The carrier aggregation (CA) or the dual connectivity (DC) mode may be used between the primary carrier and the secondary carrier in the NR multi-carrier scenario.

Optionally, the SS block auxiliary information includes at least one of the following:

Location information of the SS block, detection information of an SS sequence, and detection information of PBCH.

In this implementation manner, the location of the SS block can be determined according to the SS block auxiliary information, the SS sequence can be quickly detected according to the detection information of the SS sequence, and a PBCH signal can be quickly detected according to the detection information of the PBCH, thereby further improving the efficiency of searching for the SS block by the user equipment. In addition, in the embodiment of the present disclosure, the SS block auxiliary information includes, but not limited to, one or more of the location information of the SS block, the detection information of the SS sequence and the detection information of the PBCH, and may further include other information, which are not limited in the embodiment of the present disclosure. In addition, the SS sequence may include a Primary Synchronization Signal (PSS) sequence and/or a Secondary Synchronization Signal (SSS) sequence.

Optionally, the location information of the SS block includes at least one of the following:

time domain location information of the SS block, frequency domain location information of the SS block, and numerology of the carrier where the SS block is located.

The detection information of the SS sequence includes a cell identifier.

The detection information of the PBCH includes at least one of the following:

power difference between De Modulation Reference Signal (DMRS) of the PBCH and the Secondary Synchronization Signal (SSS), DMRS sequence of the PBCH, and phase offset of the DMRS sequence.

The time domain location information of the SS block may be used to indicate time domain location of the SS block. The frequency domain location information of the SS block may be used to indicate a frequency location of the SS block in the frequency of the carrier, for example, a frequency location for transmission of the SS burst or frequency location for transmission of the SS block. The numerology of the carrier where the SS block is located, may be used to indicate parameter configuration of the carrier.

In addition, the cell identifier may be a cell identifier used to generate the SS sequence, for example, a Physical Cell Identifier (PCID). The detection information of the SS sequence may also be referred to as related information of the SS sequence. The DMRS of the PBCH may be a DMRS for demodulating a PBCH signal, and the PBCH signal can be accurately and quickly detected by the user equipment through the detection information of the PBCH. Further, the detection information of the PBCH may also be referred to as related information of the PBCH.

Optionally, the time domain location information of the SS block includes at least one of the following:

SS burst set period, location offset of the SS block, location of the SS block in the SS burst set, quantity of SS blocks in the SS burst set, and duration of SS burst in the SS burst set.

The location offset of the SS block includes a slot offset of the SS block or a subframe offset of the SS block.

The numerology of the carrier where the SS block is located includes at least one of the following:

Subcarrier Spacing (SCS) and Cyclic Prefix (CP) length.

The slot offset may indicate that from which slot of one cycle, the transmission of the SS block starts. The subframe offset may indicate that from which subframe of one cycle, the transmission of the SS block starts. The duration of SS burst may indicate a quantity of symbols occupied by the SS burst.

Through the time domain location information of the SS block, the user equipment can accurately and quickly search for the SS block.

In addition, through the above numerology, the user equipment can accurately acquire relevant configuration of the carrier, thereby facilitating for searching for the SS block.

Optionally, the foregoing method may further include the following steps:

Step 303: measuring and reading system information on the carrier where the SS block is located.

The carrier may be a secondary carrier, and the step 303 may include: after the frequency of the carrier is determined according to the detection configuration information, measuring and reading system information on the carrier.

Figure 4:
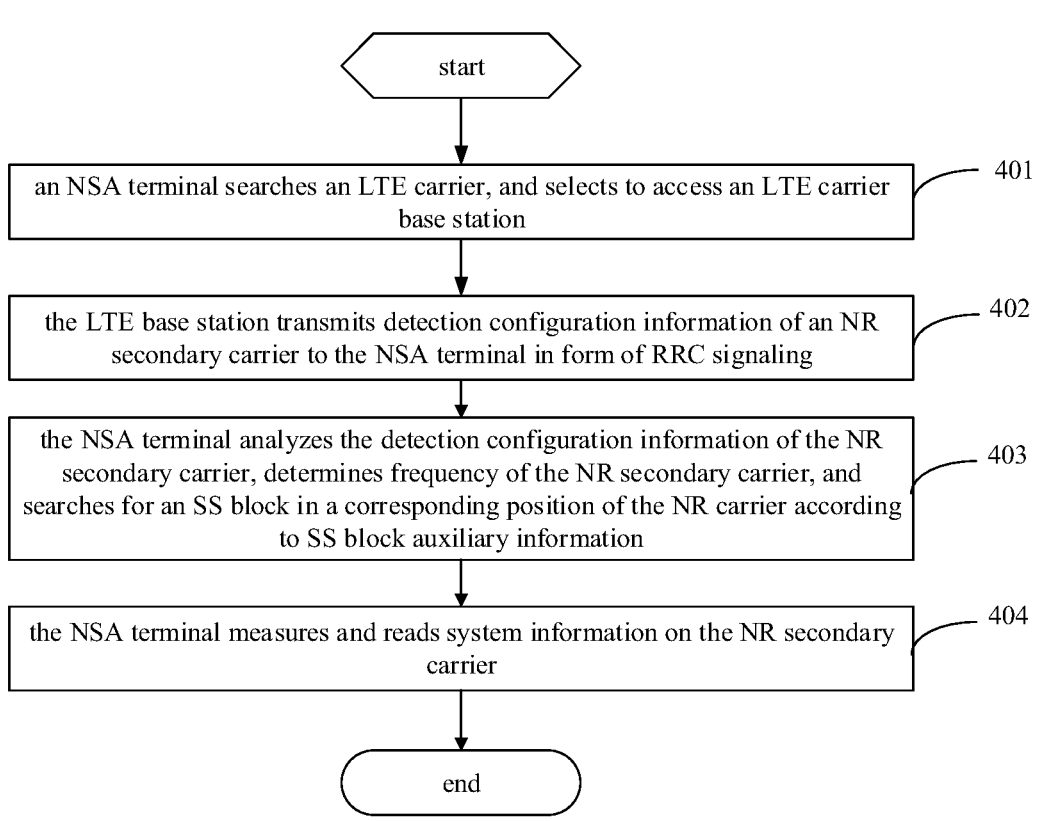
FIG. 4 is a flowchart of another method for searching for an SS block according to an embodiment of the present disclosure.

Description will be described hereinafter with an example of the LTE-NR dual connectivity scenario, in which the LTE carrier is the primary carrier, the NR carrier is the secondary carrier, and the user equipment is a Non-Standalone (NSA) terminal. As shown in FIG. 4, the following steps are included.

Step 401: an NSA terminal searches an LTE carrier, and selects to access an LTE carrier base station.

Step 402: the LTE base station transmits detection configuration information of an NR secondary carrier to the NSA terminal in form of RRC signaling.

Step 403: the NSA terminal analyzes the detection configuration information of the NR secondary carrier, determines frequency of the NR secondary carrier, and searches for an SS block in a corresponding position of the NR carrier according to SS block auxiliary information.

Step 404: the NSA terminal measures and reads system information on the NR secondary carrier.

Figure 5:
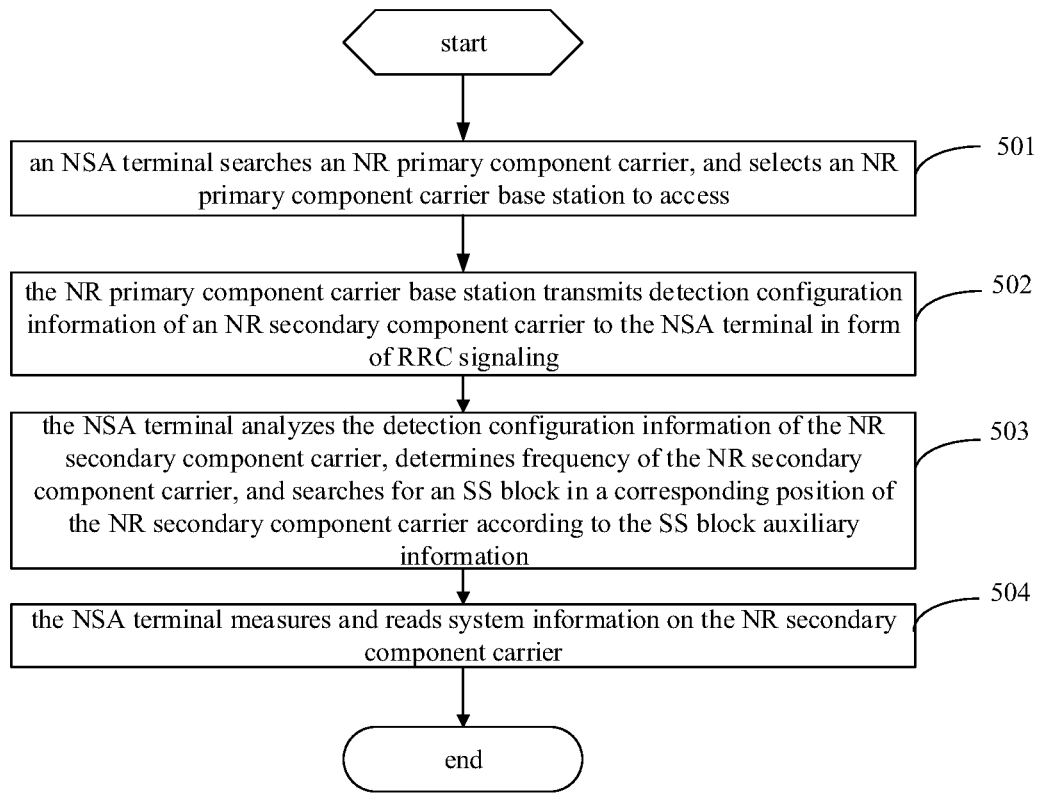
FIG. 5 is a flowchart of another method for searching for an SS block according to an embodiment of the present disclosure.

Description will be described hereinafter with an example of an NR multi-carrier network, in which both of the primary carrier and the secondary carrier are NR carriers, the carrier aggregation (CA) or the dual connectivity (DC) mode is used between the primary carrier and the secondary carrier, and the user equipment is a non-independent (NSA) terminal. As shown in FIG. 5, the following steps are included.

Step 501: an NSA terminal searches an NR primary component carrier, and selects an NR primary component carrier base station to access;

Step 502: the NR primary component carrier base station transmits detection configuration information of an NR secondary component carrier to the NSA terminal in form of RRC signaling.

Step 503: the NSA terminal analyzes the detection configuration information of the NR secondary component carrier, determines frequency of the NR secondary component carrier, and searches for an SS block in a corresponding position of the NR secondary component carrier according to the SS block auxiliary information.

Step 504: the NSA terminal measures and reads system information on the NR secondary component carrier.

Figure 6:
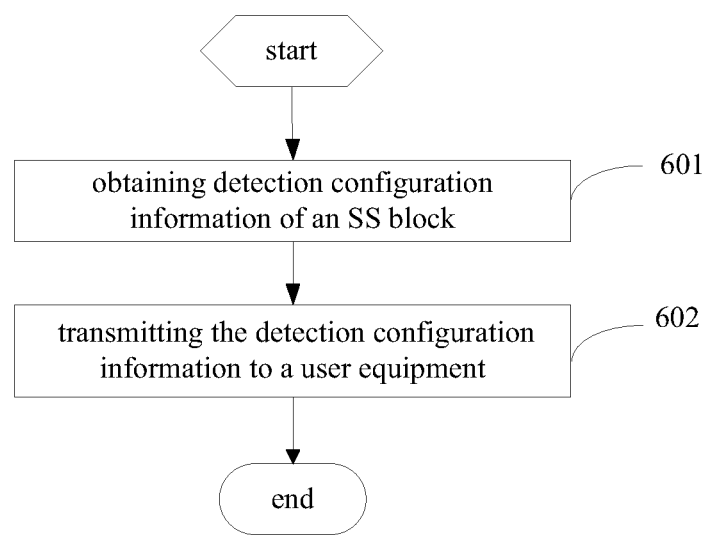
FIG. 6 is a flowchart of another method for searching for an SS block according to an embodiment of the present disclosure.

Referring to FIG. 6, FIG. 6 is a flowchart of another method for searching for an SS block according to an embodiment of the present disclosure. As shown in FIG. 6, this method is applied to a network device and includes the following steps.

Step 601: obtaining detection configuration information of an SS block.

The foregoing detection configuration information may refer to the corresponding description of the embodiment shown in FIG. 2 and FIG. 3, which will not be elaborated herein with the same beneficial effects being achieved.

Step 602: transmitting the detection configuration information to a user equipment, where the detection configuration information is used by the user equipment to search for the SS block according to the detection configuration information.

The user equipment searching for the SS block may refer to the corresponding description of the embodiment shown in FIG. 2 and FIG. 3, which will not be elaborated herein with the same beneficial effects being achieved. In addition, the frequency at which the network device transmits the SS block, can be reduced, and then the power consumption of the network device can be saved.

In addition, in the embodiment of the present disclosure, the foregoing detection configuration information may be generated by the network device, or may be received by the network device from a secondary carrier network device, which is not limited in this embodiment of the present disclosure.

Optionally, the detection configuration information includes at least one of the following:

frequency information of carrier and SS block auxiliary information.

The detection configuration information may refer to the corresponding description of the embodiment shown in FIG. 3, which will not be elaborated herein with the same beneficial effects being achieved.

Optionally, the detection configuration information is used by the user equipment to determine frequency of the carrier according to the frequency information and search for the SS block at the frequency; or, the detection configuration information is used by the user equipment to search for frequency of the carrier, and search for the SS block at the frequency according to the SS block auxiliary information; or, the detection configuration information is used by the user equipment to determine frequency of the carrier according to the frequency information and search for the SS block at the frequency according to the SS block auxiliary information.

The detection configuration information may refer to the corresponding description of the embodiment shown in FIG. 3, which will not be elaborated herein with the same beneficial effects being achieved.

Optionally, the carrier is a secondary carrier, and the network device is a primary carrier network device.

The detection configuration information is used by the user equipment to search for the SS block on a corresponding secondary carrier according to the detection configuration information.

The secondary carrier and the primary carrier network device may refer to the corresponding description of the embodiment shown in FIG. 3, which will not be elaborated herein with the same beneficial effects being achieved.

Optionally, transmitting the detection configuration information to the user equipment, includes:

transmitting high layer signaling to the user equipment, where the high layer signaling includes the detection configuration information of the SS block.

The transmission of the detection configuration information through the high layer signaling may refer to the corresponding description of the embodiment shown in FIG. 3, which will not be elaborated herein with the same beneficial effects being achieved.

Optionally, the secondary carrier is an NR carrier, and the primary carrier network device is an LTE network device; or, the secondary carrier is an NR secondary component carrier, and the primary carrier network device is an NR network device.

The secondary carrier may refer to the corresponding description of the embodiment shown in FIG. 3, which will not be elaborated herein with the same beneficial effects being achieved.

Optionally, the SS block auxiliary information includes at least one of the following:

Location information of the SS block, detection information of an SS sequence, and detection information of PBCH.

The SS block auxiliary information may refer to the corresponding description of the embodiment shown in FIG. 3, which will not be elaborated herein with the same beneficial effects being achieved.

Optionally, the location information of the SS block includes at least one of the following:

time domain location information of the SS block, frequency domain location information of the SS block, and numerology of the carrier where the SS block is located.

The detection information of the SS sequence includes a cell identifier.

The detection information of the PBCH includes at least one of the following:

power difference between De Modulation Reference Signal (DMRS) of the PBCH and the Secondary Synchronization Signal (SSS), DMRS sequence of the PBCH, and phase offset of the DMRS sequence.

The SS block auxiliary information may refer to the corresponding description of the embodiment shown in FIG. 3, which will not be elaborated herein with the same beneficial effects being achieved.

Optionally, the time domain location information of the SS block includes at least one of the following:

SS burst set period, location offset of the SS block, location of the SS block in the SS burst set, quantity of SS blocks in the SS burst set, and duration of SS burst in the SS burst set.

The location offset of the SS block includes a slot offset of the SS block or a subframe offset of the SS block.

The numerology of the carrier where the SS block is located includes at least one of the following:

Subcarrier Spacing (SCS) and Cyclic Prefix (CP) length.

The SS block auxiliary information may refer to the corresponding description of the embodiment shown in FIG. 3, which will not be elaborated herein with the same beneficial effects being achieved.

In this embodiment, the detection configuration information is transmitted to the user equipment, so that the user equipment can search for the SS block according to the detection configuration information. Since the user equipment searches for the SS block according to the detection configuration information, the efficiency of searching for the SS block can be improved. In addition, the frequency at which the network device transmits the SS block, can be reduced, and then the power consumption of the network device can be saved.

Figure 7:
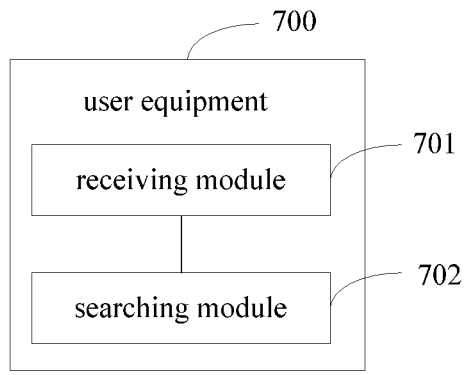
FIG. 7 is a structural diagram of a user equipment according to an embodiment of the present disclosure.

Referring to FIG. 7, FIG. 7 is a structural diagram of a user equipment according to an embodiment of the present disclosure. As shown in FIG. 7, the user equipment 700 includes:

a receiving module 701 configured to receive detection configuration information of an SS block transmitted by a network device;

a searching module 702 configured to search for the SS block according to the detection configuration information.

Optionally, the detection configuration information includes at least one of the following:

frequency information of carrier and SS block auxiliary information.

Optionally, the searching module 702 is specifically configured to determine frequency of the carrier according to the frequency information and search for the SS block at the frequency; or, the searching module 702 is specifically configured to search for frequency of the carrier and search for the SS block at the frequency according to the SS block auxiliary information; or, the searching module 702 is specifically configured to determine frequency of the carrier according to the frequency information, and search for the SS block at the frequency according to the SS block auxiliary information.

Optionally, the carrier is a secondary carrier, and the receiving module 701 is specifically configured to receive the detection configuration information of the SS block transmitted by a primary carrier network device.

The searching module 702 is specifically configured to search for the SS block on a corresponding secondary carrier according to the detection configuration information.

Optionally, the receiving module 701 is specifically configured to receive high layer signaling transmitted by the primary carrier network device, where the high layer signaling includes the detection configuration information of the SS block.

Optionally, the secondary carrier is an NR carrier, and the primary carrier network device is an LTE network device; or, the secondary carrier is an NR secondary component carrier, and the primary carrier network device is an NR network device.

Optionally, the SS block auxiliary information includes at least one of the following:

Location information of the SS block, detection information of an SS sequence, and detection information of PBCH.

Optionally, the location information of the SS block includes at least one of the following:

time domain location information of the SS block, frequency domain location information of the SS block, and numerology of the carrier where the SS block is located.

The detection information of the SS sequence includes a cell identifier.

The detection information of the PBCH includes at least one of the following:

power difference between De Modulation Reference Signal (DMRS) of the PBCH and the Secondary Synchronization Signal (SSS), DMRS sequence of the PBCH, and phase offset of the DMRS sequence.

Optionally, the time domain location information of the SS block includes at least one of the following:

SS burst set period, location offset of the SS block, location of the SS block in the SS burst set, quantity of SS blocks in the SS burst set, and duration of SS burst in the SS burst set.

The location offset of the SS block includes a slot offset of the SS block or a subframe offset of the SS block.

The numerology of the carrier where the SS block is located includes at least one of the following:

Subcarrier Spacing (SCS) and Cyclic Prefix (CP) length.

Figure 8:
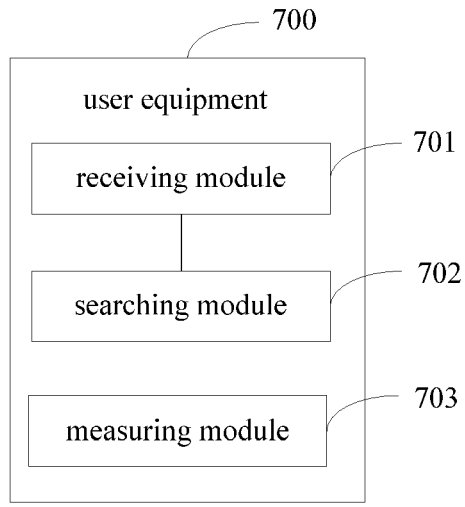
FIG. 8 is a structural diagram of a user equipment according to another embodiment of the present disclosure.

Optionally, as shown in FIG. 8, the user equipment 700 further includes:

a measuring module 703 configured to measure and read system information on a carrier where the SS block is located.

It should be noted that, the user equipment 700 in this embodiment may be the user equipment in any method embodiment of the present disclosure, and any implementation manner of the user equipment in the method embodiment of the present disclosure may be implemented by the user equipment 700 in this embodiment with the same beneficial effects being achieved, which will not be elaborated herein.

Figure 9:
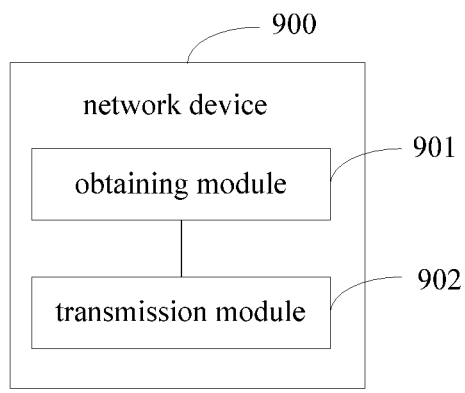
FIG. 9 is a structural diagram of a network device according to an embodiment of the present disclosure.

Referring to FIG. 9, FIG. 9 is a structural diagram of a network device according to an embodiment of the present disclosure. As shown in FIG. 9, the network device 900 includes:

an obtaining module 901 configured to obtain detection configuration information of an SS block;

a transmission module 902 configured to transmit the detection configuration information to a user equipment, where the detection configuration information is used by the user equipment to search for the SS block according to the detection configuration information.

Optionally, the detection configuration information includes at least one of the following:

frequency information of carrier and SS block auxiliary information.

Optionally, the detection configuration information is used by the user equipment to determine frequency of the carrier according to the frequency information and search for the SS block at the frequency; or, the detection configuration information is used by the user equipment to search for frequency of the carrier, and search for the SS block at the frequency according to the SS block auxiliary information; or, the detection configuration information is used by the user equipment to determine frequency of the carrier according to the frequency information and search for the SS block at the frequency according to the SS block auxiliary information.

Optionally, the carrier is a secondary carrier, and the network device is a primary carrier network device.

The detection configuration information is used by the user equipment to search for the SS block on a corresponding secondary carrier according to the detection configuration information.

Optionally, the transmission module 902 is specifically configured to transmit high layer signaling to the user equipment, where the high layer signaling includes the detection configuration information of the SS block.

Optionally, the secondary carrier is an NR carrier, and the primary carrier network device is an LTE network device; or, the secondary carrier is an NR secondary component carrier, and the primary carrier network device is an NR network device.

Optionally, the SS block auxiliary information includes at least one of the following:

Location information of the SS block, detection information of an SS sequence, and detection information of PBCH.

Optionally, the location information of the SS block includes at least one of the following:

time domain location information of the SS block, frequency domain location information of the SS block, and numerology of the carrier where the SS block is located.

The detection information of the SS sequence includes a cell identifier.

The detection information of the PBCH includes at least one of the following:

power difference between De Modulation Reference Signal (DMRS) of the PBCH and the Secondary Synchronization Signal (SSS), DMRS sequence of the PBCH, and phase offset of the DMRS sequence.

Optionally, the time domain location information of the SS block includes at least one of the following:

SS burst set period, location offset of the SS block, location of the SS block in the SS burst set, quantity of SS blocks in the SS burst set, and duration of SS burst in the SS burst set.

The location offset of the SS block includes a slot offset of the SS block or a subframe offset of the SS block.

The numerology of the carrier where the SS block is located includes at least one of the following:

Subcarrier Spacing (SCS) and Cyclic Prefix (CP) length.

It should be noted that, the network device 900 in this embodiment may be the network device in any method embodiment of the present disclosure, and any implementation manner of the network device in the method embodiment of the present disclosure may be implemented by the network device 900 in this embodiment with the same beneficial effects being achieved, which will not be elaborated herein.

Figure 10:
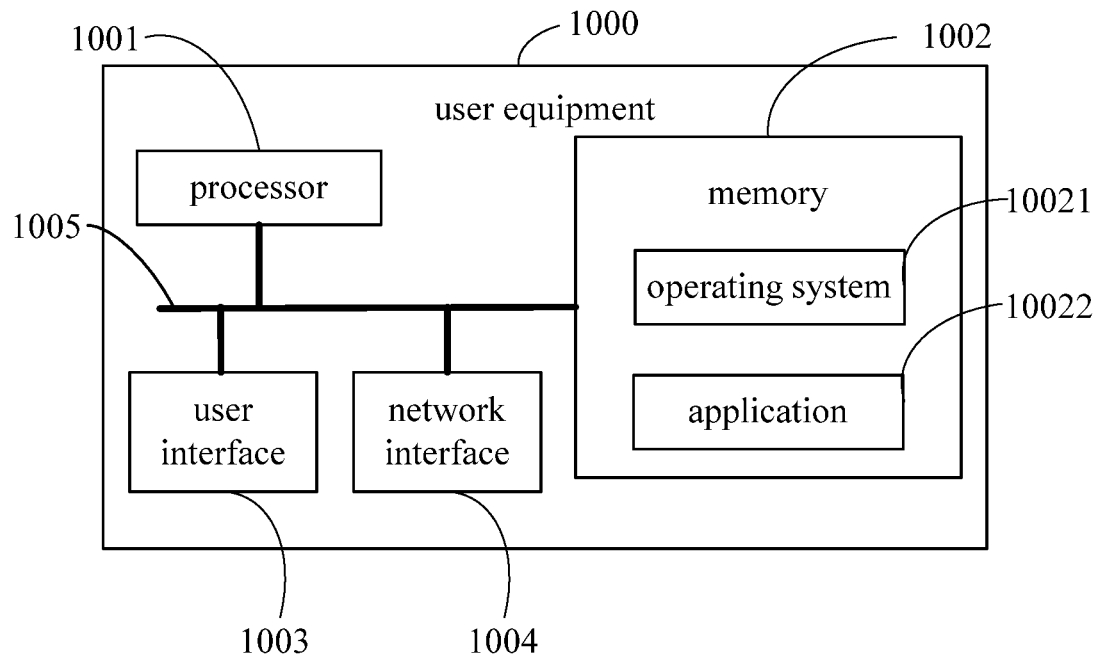
FIG. 10 is a structural diagram of a user equipment according to another embodiment of the present disclosure.

Referring to FIG. 10, FIG. 10 is a structural diagram of a user equipment according to another embodiment of the present disclosure. As shown in FIG. 10, the user equipment 1000 includes: at least one processor 1001, a memory 1002, at least one network interface 1004, and a user interface 1003. Each component within the user equipment 1000 may be coupled through a bus system 1005. It may be understood that, the bus system 1005 is configured to implement connection communications among these components. In addition to data bus, the bus system 1005 further includes a power bus, a control bus and a status signal bus. However, for clarity of description, various buses in FIG. 10 are labeled as the bus system 1005.

The user interface 1003 may include a display device, a keyboard, or a clicking device (e.g., a mouse, a track ball, a touch pad, or a touch screen, and so on).

It may be understood that, in the embodiment of the present disclosure, the memory 1002 may be a transitory memory, or a non-transitory memory, or may include both of a transitory memory and a non-transitory memory. The non-transitory memory may be a Read-Only Memory (ROM), a Programmable ROM (PROM), an Erasable PROM (EPROM), an Electrically EPROM (EEPROM) or a flash memory. The transitory-memory may be a Random Access Memory (RAM), which is taken as an external cache. By way of illustration and not limitation, many forms of RAM are available, e.g., a Static RAM (SRAM), a Dynamic RAM (DRAM), a Double Data Rate SDRAM (DDRSDRAM), an Enhanced SDRAM (ESDRAM), a Synchlink DRAM (SLDRAM) and a Direct Rambus RAM (DRRAM). The memory 1002 of the system and method described herein is intended to include, without limitation to, these and any other suitable types of memory.

In some embodiments, the memory 1002 includes the following elements, executable modules, or data structures, or their subset, or their extension set: an Operating System (OS) 10021 and an application 10022.

The OS 10021 includes various system programs, such as, a frame layer, a core library layer, a driver layer, and so on, which are configured to implement various basic services and process hardware-based tasks. The application 10022 includes various applications, e.g., a Media Player, a Browser, and so on, which are configured to implement various application services. The program implementing the method in the embodiment of the present disclosure may be included by the application 10022.

In the embodiment of the present disclosure, by calling the program or instruction stored in the memory 1002, specifically, the program or instruction stored by the application 1002, the processor 1001 is configured to:

receive detection configuration information of an SS block transmitted by a network device; and search for the SS block according to the detection configuration information.

Foregoing methods provided by the embodiment of the present disclosure may be applied to the processor 1001, or may be implemented by the processor 1001. The processor 1001 may be an integrated circuit chip with signal processing capability. In the implementation process, various blocks of foregoing method may be completed, by using the integrated logic circuit of hardware in the processor 1001, or by using instructions in the form of software. Foregoing processor 1001 may be a general processor, a Digital Signal Processor (DSP), an Application Specific Integrated Circuit (ASIC), a Field Programmable Gate Array (FPGA), or other programmable logic devices, discrete gates or transistor logic devices, discrete hardware components. Each method, block and logical block diagram in the embodiments of the application may be implemented, or executed. The general processor may be a micro-processor, or any conventional processor, and so on. Combining with method blocks in the embodiments of the present disclosure, it may be directly implemented by a hardware decoding processor, or may be executed by a combination of hardware and software modules in the decoding processor. Software modules may be located in a mature storage medium in the field, such as, an RAM, a flash memory, an ROM, a PROM, an electrically erasable programmable memory, a register. The storage medium is located in the memory 1002, the processor 1001 reads information in the memory 1002, and completes foregoing method blocks in combination with the hardware.

It may be understood that, these embodiments described in the application may be implemented by hardware, software, firmware, middleware, microcode, or a combination thereof. For hardware implementation, a processing unit may be implemented in one or more ASICs, DSPs, DSP Devices (DSPDs), Programmable Logic Device (PLDs), FPGAs, general processors, controllers, micro-controllers, micro-processors, other electronic units or combinations thereof for performing the functions described in the application.

For software implementation, the techniques described in the application may be implemented by modules (e.g., procedures, functions, etc.) that perform the functions of the application. Software codes may be stored in the memory, and executed by the processor. The memory may be implemented in the processor or external to the processor.

Optionally, the detection configuration information includes at least one of the following:

frequency information of carrier and SS block auxiliary information.

Optionally, searching for the SS block according to the detection configuration information, that is performed by the processor 1001, includes:

determining frequency of the carrier according to the frequency information, and searching for the SS block at the frequency; or, searching for frequency of the carrier, and searching for the SS block at the frequency according to the SS block auxiliary information; or, determining frequency of the carrier according to the frequency information, and searching for the SS block at the frequency according to the SS block auxiliary information.

Optionally, the carrier is a secondary carrier. The receiving detection configuration information of the SS block transmitted by the network device, that is performed by the processor 1001, includes:

receiving the detection configuration information of the SS block transmitted by a primary carrier network device.

The searching for the SS block according to the detection configuration information, that is performed by the processor 1001, includes:

searching for the SS block on a corresponding secondary carrier according to the detection configuration information.

Optionally, the receiving the detection configuration information of the SS block transmitted by the primary carrier network device, that is performed by the processor 1001, includes:

receiving high layer signaling transmitted by the primary carrier network device, where the high layer signaling includes the detection configuration information of the SS block.

Optionally, the secondary carrier is an NR carrier, and the primary carrier network device is an LTE network device; or, the secondary carrier is an NR secondary component carrier, and the primary carrier network device is an NR network device.

Optionally, the SS block auxiliary information includes at least one of the following:

Location information of the SS block, detection information of an SS sequence, and detection information of PBCH.

Optionally, the location information of the SS block includes at least one of the following:

time domain location information of the SS block, frequency domain location information of the SS block, and numerology of the carrier where the SS block is located.

The detection information of the SS sequence includes a cell identifier.

The detection information of the PBCH includes at least one of the following:

power difference between De Modulation Reference Signal (DMRS) of the PBCH and the Secondary Synchronization Signal (SSS), DMRS sequence of the PBCH, and phase offset of the DMRS sequence.

Optionally, the time domain location information of the SS block includes at least one of the following:

SS burst set period, location offset of the SS block, location of the SS block in the SS burst set, quantity of SS blocks in the SS burst set, and duration of SS burst in the SS burst set.

The location offset of the SS block includes a slot offset of the SS block or a subframe offset of the SS block.

The numerology of the carrier where the SS block is located includes at least one of the following:

Subcarrier Spacing (SCS) and Cyclic Prefix (CP) length.

Optionally, after searching for the SS block according to the detection configuration information, the processor 1001 is further configured to:

measure and read system information on the carrier where the SS block is located.

It should be noted that, the user equipment 1000 in this embodiment may be the user equipment in any method embodiment of the present disclosure, and any implementation manner of the user equipment in the method embodiment of the present disclosure may be implemented by the user equipment 1000 in this embodiment with the same beneficial effects being achieved, which will not be elaborated herein.

Figure 11:
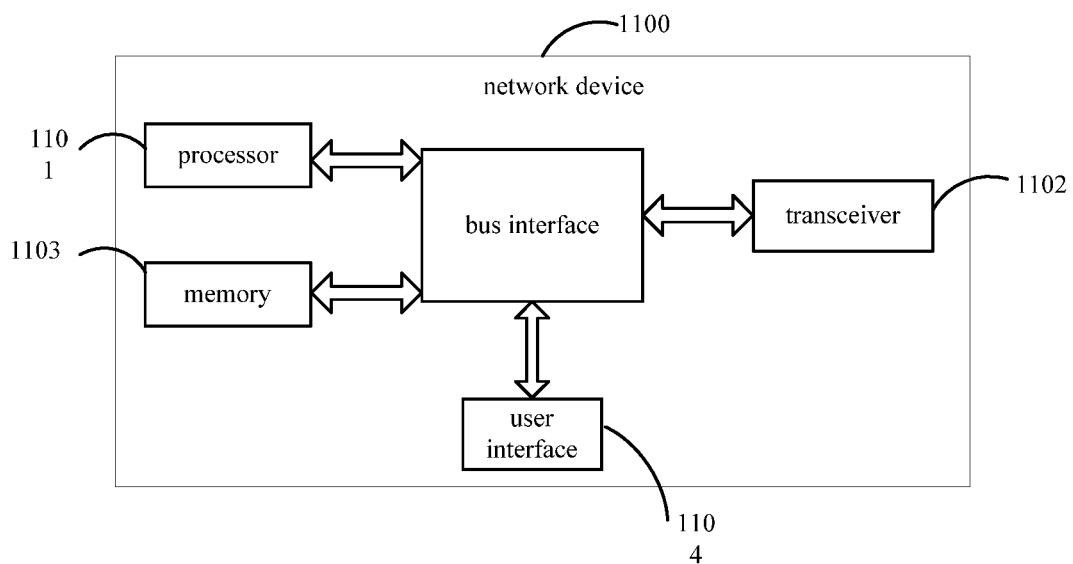
FIG. 11 is a structural diagram of a network device according to another embodiment of the present disclosure.

Referring to FIG. 11, FIG. 11 is a structural diagram of a network device according to another embodiment of the present disclosure. As shown in FIG. 11, the network device 1100 includes: a processor 1101, a transceiver 1102, a memory 1103, a user interface 1104, and a bus interface.

The processor 1101 is configured to read a program in the memory 1103 and perform the following process:

obtaining detection configuration information of an SS block;

transmitting the detection configuration information to a user equipment, where the detection configuration information is used by the user equipment to search for the SS block according to the detection configuration information.

The transceiver 1102 is configured to receive and transmit data under the control of the processor 1101, and the transceiver 1102 includes at least two antenna ports.

In FIG. 11, the bus architecture may include any number of interconnected buses and bridges. Specifically, one or more processors represented by the processor 1001 and various circuits of memory represented by the memory 1003 are linked together. The bus architecture can also link various other circuits, such as peripherals, voltage regulators, and power management circuits, as is known in the art. Therefore, it will not be further described. The bus interface provides an interface. The transceiver 1002 may be multiple components, including a transmitter and a receiver, providing units for communicating with various other devices on a transmission medium. For different user equipment, the user interface 1104 may also be an interface capable of externally connecting required devices, including but not limited to a keypad, a display device, a speaker, a microphone, a joystick, and the like.

The processor 1101 is responsible for managing the bus architecture and general processing, and the memory 1103 can store data used by the processor 1101 when performing operations.

Optionally, the detection configuration information includes at least one of the following:

frequency information of carrier and SS block auxiliary information.

Optionally, the detection configuration information is used by the user equipment to determine frequency of the carrier according to the frequency information and search for the SS block at the frequency; or, the detection configuration information is used by the user equipment to search for frequency of the carrier, and search for the SS block at the frequency according to the SS block auxiliary information; or, the detection configuration information is used by the user equipment to determine frequency of the carrier according to the frequency information and search for the SS block at the frequency according to the SS block auxiliary information.

Optionally, the carrier is a secondary carrier, and the network device is a primary carrier network device.

The detection configuration information is used by the user equipment to search for the SS block on a corresponding secondary carrier according to the detection configuration information.

Optionally, transmitting the detection configuration information to the user equipment, that is performed by the processor 1101, includes:

transmitting high layer signaling to the user equipment, where the high layer signaling includes the detection configuration information of the SS block.

Optionally, the secondary carrier is an NR carrier, and the primary carrier network device is an LTE network device; or, the secondary carrier is an NR secondary component carrier, and the primary carrier network device is an NR network device.

Optionally, the SS block auxiliary information includes at least one of the following:

Location information of the SS block, detection information of an SS sequence, and detection information of PBCH.

Optionally, the location information of the SS block includes at least one of the following:

time domain location information of the SS block, frequency domain location information of the SS block, and numerology of the carrier where the SS block is located.

The detection information of the SS sequence includes a cell identifier.

The detection information of the PBCH includes at least one of the following:

power difference between De Modulation Reference Signal (DMRS) of the PBCH and the Secondary Synchronization Signal (SSS), DMRS sequence of the PBCH, and phase offset of the DMRS sequence.

Optionally, the time domain location information of the SS block includes at least one of the following:

SS burst set period, location offset of the SS block, location of the SS block in the SS burst set, quantity of SS blocks in the SS burst set, and duration of SS burst in the SS burst set.

The location offset of the SS block includes a slot offset of the SS block or a subframe offset of the SS block.

The numerology of the carrier where the SS block is located includes at least one of the following:

Subcarrier Spacing (SCS) and Cyclic Prefix (CP) length.

It should be noted that, the network device 1100 in this embodiment may be the network device in any method embodiment of the present disclosure, and any implementation manner of the network device in the method embodiment of the present disclosure may be implemented by the network device 1100 in this embodiment with the same beneficial effects being achieved, which will not be elaborated herein.

One embodiment of the present disclosure further provides a computer readable storage medium, which stores a search program of the SS block. The search program of the SS block is executed by the processor to implement steps of the method for searching for SS block on the user equipment according to the embodiment of the present disclosure.

One embodiment of the present disclosure further provides a computer readable storage medium, which stores a search program of the SS block. The search program of the SS block is executed by the processor to implement steps of the method for searching for SS block on the network device according to the embodiment of the present disclosure.

Persons having ordinary skill in the art may learn that, units and algorithm blocks of each example described by embodiments of the application may be implemented in electronic hardware, or in a combination of computer software and electronic hardware. Whether these functions are performed by hardware or software depends on specific application and design constraints of technical solutions. For each specific application, a person skilled in the art may adopt a different method to implement the described functions. However, such implementation should not be considered to go beyond the scope of the application.

Persons having ordinary skill in the art may clearly learn that, for convenience and conciseness of description, the specific working process of above-described system, device and unit may refer to corresponding process of foregoing method embodiments, which is not repeated here.

In the embodiments of the application, it should be understood that, the disclosed devices and methods may be implemented with other methods. For example, the above-described device embodiments are only illustrative, e.g., the division of the unit is only a logic function division. In practical implementation, there may be another division method. For example, multiple units or components may be combined, or integrated into another system, or some features may be omitted, or not executed. From another point, the mutual coupling or direct coupling, or communication connection shown or discussed may be indirect coupling, or communication connections through some interfaces, devices, or units, which may be electronic, mechanical, or in other form.

Units described as separate components may be, or may be not physically separate. A component displayed as a unit may be, or may be not a physical unit, that is, it may be located in one place, or may be distributed to multiple network units. According to practical requirements, some units or all the units may be selected to implement the objective of solutions in the embodiments of the application.

In addition, in each embodiment of the present disclosure, various functional units may be integrated into a processing unit. Alternatively, each unit physically exists alone. Still alternatively, two or more units may be integrated into one unit.

When the functions are implemented in the form of software functional unit, which is sold or used as an independent product, such software functional unit may be stored in a computer readable storage medium. Based on such understandings, the technical solution of the present disclosure, or, a part contributing to the related art, or a part of the technical solution may be embodied in the form of a software product. The computer software produce is stored in one storage medium, including several instructions to enable a computer device (may be a Personal Computer (PC), a server, or a network device, etc.) to implement all the blocks, or some blocks in the method of each embodiment of the present disclosure. Foregoing storage medium includes various media that can store program codes, such as a U disk, a mobile hard disk, an ROM, an RAM, a disk, or a Compact Disk (CD), and so on.

Foregoing is only specific implementations of the application. However, protection scope of the application is not limited. Any changes or substitutions that are obvious to those skilled in the art within the scope of the application are covered by the scope of the application. Therefore, the protection scope of the disclosure should be determined by the scope of the claims.

What is claimed is:

1. A user equipment, comprising: a processor, a memory, a network interface and a user interface; wherein the processor, the memory, the network interface and the user interface are coupled together by a bus system, the processor is configured to read a program in the memory to perform:
   receiving detection configuration information of synchronization signal (SS) block transmitted by a network device; and
   searching for the SS block according to the detection configuration information;
   wherein when receiving detection configuration information of the SS block transmitted by a network device, the processor is configured to read the program in the memory to perform: receiving the detection configuration information of the SS block transmitted by a primary carrier network device; and
   when searching for the SS block according to the detection configuration information, the processor is configured to read the program in the memory to perform: searching for the SS block on a corresponding secondary carrier according to the detection configuration information.

2. The user equipment of claim 1, wherein the detection configuration information comprises at least one of the following: frequency information of carrier and SS block auxiliary information.

3. The user equipment of claim 2, wherein when searching for the SS block according to the detection configuration information, the processor is configured to read the program in the memory to perform:
   determining frequency of the carrier according to the frequency information, and searching for the SS block at the frequency; or,
   searching for frequency of the carrier, and searching for the SS block at the frequency according to the SS block auxiliary information; or,
   determining frequency of the carrier according to the frequency information, and searching for the SS block at the frequency according to the SS block auxiliary information.

4. The user equipment of claim 3, wherein the carrier is a secondary carrier.

5. The user equipment of claim 4, wherein when receiving the detection configuration information of the SS block transmitted by a primary carrier network device, the processor is configured to read the program in the memory to perform:
   receiving high layer signaling transmitted by the primary carrier network device, wherein the high layer signaling comprises the detection configuration information of the SS block.

6. The user equipment of claim 4, wherein the secondary carrier is a new radio (NR) carrier, and the primary carrier network device is a long term evolution (LTE) network device; or,
   the secondary carrier is an NR secondary component carrier, and the primary carrier network device is an NR network device.

7. The user equipment of claim 2, wherein the SS block auxiliary information comprises at least one of the following:
   location information of the SS block, detection information of an SS sequence, and detection information of Physical Broadcast Channel (PBCH).

8. The user equipment of claim 7, wherein the location information of the SS block comprises at least one of the following:
- time domain location information of the SS block, frequency domain location information of the SS block, and numerology of the carrier where the SS block is located;
- the detection information of the SS sequence comprises a cell identifier;
- the detection information of the PBCH comprises at least one of the following:
- power difference between De Modulation Reference Signal (DMRS) of the PBCH and the Secondary Synchronization Signal (SSS), DMRS sequence of the PBCH, and phase offset of the DMRS sequence.

9. The user equipment of claim 8, wherein the time domain location information of the SS block comprises at least one of the following:
- SS burst set period, location offset of the SS block, location of the SS block in the SS burst set, quantity of SS blocks in the SS burst set, and duration of SS burst in the SS burst set;
- the location offset of the SS block comprises a slot offset of the SS block or a subframe offset of the SS block;
- the numerology of the carrier where the SS block is located comprises at least one of the following:
- subcarrier Spacing (SCS) and cyclic Prefix (CP) length.

10. The user equipment of claim 1, wherein after the searching for the SS block according to the detection configuration information, the processor is further configured to read the program in the memory to perform:
- measuring and reading system information on the carrier where the SS block is located.

11. A network device, comprising: a processor, a memory, a transceiver and a user interface; wherein the processor, the memory, the transceiver and the user interface are coupled together by a bus system, and the processor is configured to read a program in the memory to perform:
- obtaining detection configuration information of Synchronization signal (SS) block; and
- transmitting the detection configuration information to user equipment, wherein the detection configuration information is used by the user equipment to search for the SS block according to the detection configuration information;
- wherein the detection configuration information is used by the user equipment to search for the SS block on a corresponding secondary carrier according to the detection configuration information.

12. The network device of claim 11, wherein the detection configuration information comprises at least one of the following: frequency information of carrier and SS block auxiliary information.

13. The network device of claim 12, wherein the detection configuration information is used by the user equipment to determine frequency of the carrier according to the frequency information and search for the SS block at the frequency; or,
- the detection configuration information is used by the user equipment to search for frequency of the carrier, and search for the SS block at the frequency according to the SS block auxiliary information; or,
- the detection configuration information is used by the user equipment to determine frequency of the carrier according to the frequency information, and search for the SS block at the frequency according to the SS block auxiliary information.

14. The network device of claim 13, wherein the carrier is a secondary carrier, and the network device is a primary carrier network device.

15. The network device of claim 14, wherein when transmitting the detection configuration information to user equipment, the processor is configured to read the program in the memory to perform:
- transmitting high layer signaling to the user equipment; wherein the high layer signaling comprises the detection configuration information of the SS block; or,
- wherein the secondary carrier is a new radio (NR) carrier, and the primary carrier network device is a long term evolution (LTE) network device; or,
- the secondary carrier is an NR secondary component carrier, and the primary carrier network device is an NR network device.

16. The network device of claim 12, wherein the SS block auxiliary information comprises at least one of the following:
- location information of the SS block, detection information of an SS sequence, and detection information of Physical Broadcast Channel (PBCH).

17. The network device of claim 16, wherein the location information of the SS block comprises at least one of the following:
- time domain location information of the SS block, frequency domain location information of the SS block, and numerology of the carrier where the SS block is located;
- the detection information of the SS sequence comprises a cell identifier;
- the detection information of the PBCH comprises at least one of the following:
- power difference between De Modulation Reference Signal (DMRS) of the PBCH and the Secondary Synchronization Signal (SSS), DMRS sequence of the PBCH, and phase offset of the DMRS sequence.

18. The network device of claim 17, wherein the time domain location information of the SS block comprises at least one of the following:
- SS burst set period, location offset of the SS block, location of the SS block in the SS burst set, quantity of SS blocks in the SS burst set, and duration of SS burst in the SS burst set;
- the location offset of the SS block comprises a slot offset of the SS block or a subframe offset of the SS block;
- the numerology of the carrier where the SS block is located comprises at least one of the following:
- subcarrier Spacing (SCS) and Cyclic Prefix (CP) length.

19. A non-transitory computer readable storage medium comprising a search program of a Synchronization Signal Block (SS block) stored therein; wherein the search program of the SS block is executed by a processor to implement:
- receiving detection configuration information of the SS block transmitted by a network device; and
- searching for the SS block according to the detection configuration information;
- wherein when receiving detection configuration information of the SS block transmitted by a network device, the processor is configured to read the program in the memory to perform: receiving the detection configuration information of the SS block transmitted by a primary carrier network device; and
- when searching for the SS block according to the detection configuration information, the processor is configured to read the roam in the memory to perform:

searching for the SS block on a corresponding secondary carrier according to the detection configuration information.

20. The non-transitory computer readable storage medium of claim 19, wherein the detection configuration information comprises at least one of the following: frequency information of carrier and SS block auxiliary information.

* * * * *